Aug. 22, 1950   L. H. BEVARD   2,519,877
ELECTRODE HOLDER
Filed June 19, 1947
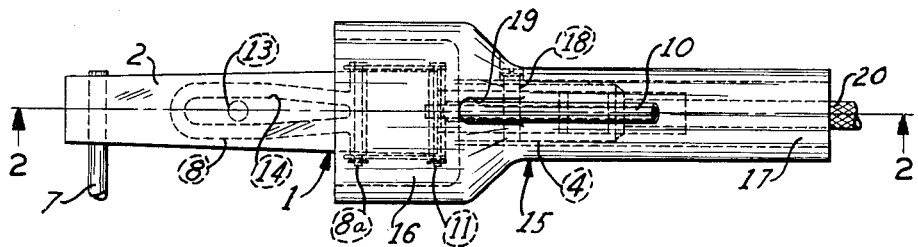
FIG. 1.
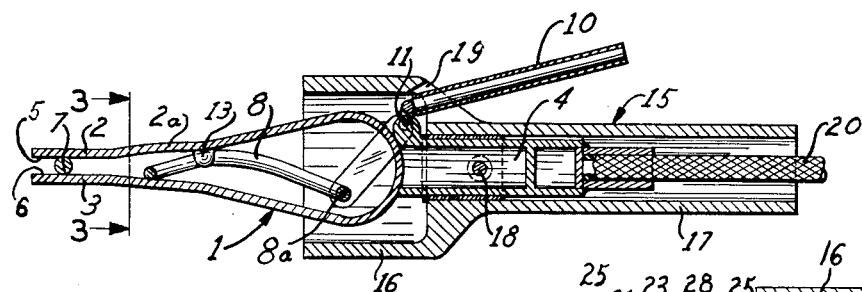
FIG. 2.
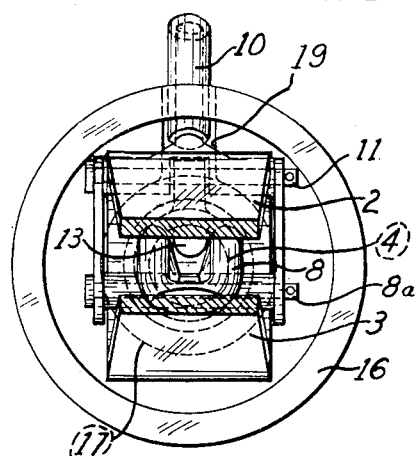
FIG. 3.
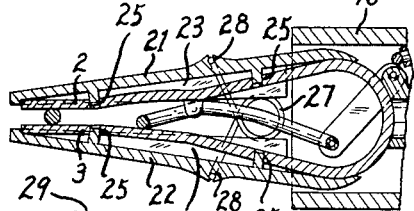
FIG. 4.
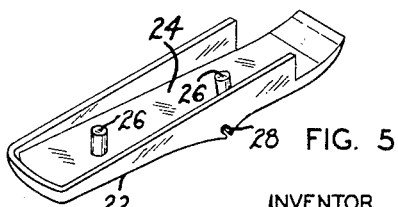
FIG. 6
FIG. 5
INVENTOR
LAWRENCE H. BEVARD
BY Rodney Bedell
ATTORNEY Patented Aug. 22, 1950

2,519,877

UNITED STATES PATENT OFFICE 2,519,877

ELECTRODE HOLDER

Lawrence H. Bevard, St. Louis, Mo.

Application June 19, 1947, Serial No. 755,795

13 Claims. (Cl. 219—8)

The invention relates to the art of electric welding and consists in improvements in an electrode holding tool of the kind described in an earlier Patent No. 2,124,283 to the present inventor for facilitating manual manipulation of the electrode and the conveying of current from a source of supply to the electrode.

One object of the present invention is to render the tool safer than those used previously by providing insulating guards on the electrode holding jaws and by completely encircling the base of the jaws with an insulating housing to eliminate undesirable short-circuiting when the tool is used in close places and yet permitting adequate insertion of the tool into recesses in the work.

Another object is to completely house the jaw spreading mechanism, except for a rearwardly projecting operating lever, between the jaws and within the housing and thereby protect the mechanism from contact with exterior objects.

Another object is to simplify and improve the electrode holding jaws by forming the jaws integral with one another from a single strip of resilient metal.

These and other detailed objects of the invention will be apparent from the following description and drawings in which:

Figure 1 is a side view of the tool.

Figure 2 is a longitudinal section taken approximately on the line 2—2 of Figure 1, Figure 3 is a transverse section taken approximately on the line 3—3 of Figure 2.

Figure 4 is a longitudinal section, similar to Figure 2, showing insulating guards assembled on the electrode holding jaws.

Figure 5 is a perspective view of a guard shown in Figure 4, and

Figure 6 is a detail vertical section drawn to enlarged scale showing a guard spring retaining device assembled to a guard.

The device includes a body 1 comprising a pair of relatively wide flat electrode clamping jaws 2 and 3 formed from a single strip of resilient metal of substantially uniform thickness and gradually decreasing in width from its mid-portion to its ends. The strip is curved substantially in a semi-circle of substantial diameter at its mid portion and doubled back upon itself with its ends converging (Figure 2) and forming opposing flat faces 5 and 6 to clamp an electrode 7 between them. The semi-circular curvature and the resiliency of the strip effectively urge the jaws together after being spread apart as described below. The jaws are urged toward one another by the substantially uniform resiliency of the strip, except for the difference in resiliency due to the decreasing width of the strip from its mid-portion to its ends.

By forming the jaws as described, they may be made from a wide and relatively thin strip to provide better radiation for a given cross-sectional area necessary to conduct the welding current.

Body 1 includes a tube 4 welded or otherwise secured at one end to the bases of jaws 2 and 3. An elongated curved cam element 8, which may be formed from a stiff rod, engages jaw opposing faces 5 and 6 at longitudinally spaced points. Cam element 8 extends lengthwise of jaws 2 and 3 and is positioned wholly between the jaws.

An operating lever 10, with one end covered with insulating material, is pivoted to tube 4 by a pin 11. The other end of lever 10 is bifurcated and extends around the outer edges of the bases of jaws 2 and 3 and is connected for pivotal movement to one end of cam element 8 by a pin 8a. Downward pivotal movement of operating lever 10 towards body 1 moves cam element 8 forwardly between jaws 2 and 3 and moves the rear end of the cam element upwardly toward jaw 2 so that it fulcrums on jaw 2 with its tip bearing on jaw 3 to spread jaws 2 and 3 apart to receive electrode 7 between them. Jaw 2 preferably is curved as shown at 2a in Figure 2 adjacent the tip of cam element 8 to provide clearance for the tip as it moves lengthwise of the jaws. When operating lever 10 is released, jaws 2 and 3 spring towards one another and clamp the electrode therebetween. A projection 13 on face 5 of jaw 2 extends into an elongated aperture 14 in cam element 8 and guides the cam element as it moves lengthwise of the jaws.

A housing 15 comprising a bell shaped portion 16 and a handle 17 fits snugly over tube 4 and over the base of jaws 2 and 3 and completely encircles the base of the jaws and the associated operating lever connections to cam element 8. Housing 15 is attached to body 1 by a screw 18 extending through handle 17 and threaded into tube 4. Operating lever 10 extends through an opening 19 in housing 15. The center of gravity of the holder is rearwardly of the bell shaped portion 16. When the holder is laid on a plane surface, the jaws are always spaced therefrom irrespective of angular rotation of the holder about its axis.

A conduit 20 for the welding current is received through the outer end of handle 17 and is anchored to the inner end of body 1 in the usual manner.

Housing 15 may readily be removed from body 1 by removing screw 18 and opening jaws 2 and 3 with a wedge or other tool until operating lever 10 is pivoted towards handle 17 closely enough to permit it to pass through opening 19 in housing 15 as the housing is moved rearwardly of body 1.

In Figures 4–6, jaws 2 and 3 are provided with closely fitting guards 21 and 22 having pockets 23, 24 each having its interior cross section substantially the same shape as the exterior of the associated jaw. Guards 21, 22 cover substantially the entire exposed area of jaws 2 and 3 and preferably are made of insulating material. The outer faces of jaws 2 and 3 preferably have recesses 25 to receive inwardly extending projections 26 in pockets 23, 24. The rear ends of guards 21, 22 adjacent the base of jaws 2 and 3 extend within bell shaped portion 16 of housing 15 and may be curved inwardly to follow the contour of the jaws and further maintain assembly of the guards on the jaws. Guards 21, 22 are urged yieldingly into engagement with jaws 2 and 3 towards one another by a spring 27 extending through transverse cavities 28 in the guards. Each cavity 28 has a relatively narrow opening in the outer face of the guard which snugly receives spring 27. A semi-circular locking plate 29 preferably fits across the cavity opening and maintains guards 21, 22 and spring 27 assembled with one another when the guards are removed from jaws 2 and 3.

The guards are readily applied to and removed from jaws 2 and 3. The guards may be applied to the jaws by sliding the guards lengthwise on the jaws towards their bases until projections 26 are received in recesses 25. The guards may be removed by spreading the guards relative to the jaws until projections 26 are free of recesses 25 and sliding the guards lengthwise away from the jaw bases.

The holder described is simple in construction, is safe to use in close places, and the jaws and jaw spreading mechanism are protected by guards and housing from engagement with exterior objects.

The details of construction may be varied without departing from the spirit of the invention, and the exclusive use of those modifications coming within the scope of the claims is contemplated.

What is claimed is:

1. In an electrode holder, a body structure including a pair of relatively wide flat electrode clamping jaws having opposing flat faces and formed integral with one another from a strip of resilient metal curved back upon itself, a curved cam element extending longitudinally of the jaws and positioned wholly between said jaws and slidably engaging both of said faces, an operating lever pivoted to said body structure and connected to the end of said cam element remote from the electrode engaging ends of said jaws and adapted to move said cam element lengthwise of said jaws and to move one end of said cam element laterally of the planes of said jaws, both movements of said cam element spreading said jaws apart against the resistance of the resiliency of said strip.

2. A device of the kind described in claim 1 having a guide on one of the jaws for holding the cam element against movement crosswise of the jaws as it slides along the jaws.

3. In an electrode holder, a pair of electrode clamping jaws having opposing faces, a handle remote from said jaws, a cam element for spreading said jaws extending lengthwise of said jaws and positioned wholly between said jaws and engaging said faces at points spaced apart longitudinally of the jaws, and an operating lever with connections to said cam element spaced longitudinally of the jaws from said points and near the handle.

4. In an electrode holder, a body structure including a pair of relatively wide flat electrode clamping jaws having opposing flat faces and formed from a single strip of resilient metal, a longitudinally apertured elongated cam element extending lengthwise of and positioned wholly between said jaws and engaging the jaw opposing faces an operating lever pivoted to said body portion and having an arm terminal connected to said cam element and movable therewith lengthwise of said jaws and laterally of said jaws to spread the jaws apart against the resistance of the resiliency of said strip, and a projection on one of said opposing faces positioned in said cam element aperture to guide said cam element.

5. In an electrode holder, a pair of relatively wide flat electrode gripping jaw elements, a pair of guard elements covering the outer surfaces of said jaw elements, there being projections on one pair of said elements and recesses in the other pair of elements receiving said projections and a spring positioned exteriorly of said elements and spaced from said jaw elements and yieldingly urging said guard elements towards one another and into engagement with both of said jaw elements to maintain assembly of said elements.

6. In an electrode holder, a pair of relatively wide flat electrode gripping jaws having recesses opening outwardly thereof and having inner opposing flat faces, a guard covering the outer surfaces of each of said jaws, there being projections on said guards extending into the recesses on said jaws, and a spring positioned exteriorly of said jaws and guards and spaced from said jaws urging both of said guards towards one another and into engagement with said jaws.

7. A device of the kind described comprising a pair of guards having pockets adapted to receive jaws movable relative to one another, each of said guards having a transverse cavity, a spring extending through said guard cavities and urging said guards yieldingly towards one another, there being locking elements across the cavity openings to maintain said spring in assembly with said guards.

8. A device of the kind described comprising a pair of guards having pockets adapted to receive jaws movable relative to one another, each of said guards having a transverse cavity opening outwardly of the guard outer face, a spring extending through said guard cavities and urging said guards yieldingly towards one another, the cavity opening in the outer face of said guards being narrower than the remainder of said cavity and snugly receiving said spring to maintain said spring in assembly with said guards when said guards are removed from said jaws.

9. A device of the kind described comprising a pair of guards having pockets adapted to receive jaws movable relative to one another, each of said guards having a transverse cavity, a spring extending through said guard cavities below the outer surfaces of said guards and urging said guards yieldingly towards one another, the portions of said spring in said cavities being shielded from engagement with the work by the cavity walls.

10. In an electrode holder, a body comprising elongated jaws for gripping an electrode and a part extending rearwardly from the base of said jaws to which a current supply cable may be connected, an operating lever pivoted to said body and having a handle extending alongside but spaced from said part and also having a forward portion extending alongside but spaced from said jaws, and a housing of insulating material including a handle to be grasped by the user and surrounding said part and having a substantially bell-shaped portion facing towards the forward ends of the jaws and surrounding the base of said jaws and the forward part of said operating lever, there being a restricted aperture in the bottom of said portion through which said operating lever extends, the outer end of said bell-shaped portion being positioned to stably support the holder and hold the jaws away from the work when the holder lies on the work.

11. In an electrode holder of the class described, a jaw structure comprising a metal strip bent double to form a semi-circular rear end and straight elongated jaws, a readily applicable and detachable guard structure comprising strips of insulating material each extending substantially the full length of one of said jaws with its inner end curved to engage the curved inner end of the jaw structure, there being interengaging elements on the jaws and guard strips to prevent the guard strips from sliding on the jaws, and a spring associated with the guard strips independently of the jaws and distorted when the guard strips are applied to the outer faces of the jaws so as to thrust the guard strips and jaws toward each other.

12. In a device of the class described, a pair of electrode-gripping jaws in yielding assembly for movement towards and from each other, guards applied respectively to the outer faces of said jaws, and a spring device positioned exteriorly of said jaws and connected solely to said guards and urging the guards towards each other and towards the respective jaws on which they are mounted and forming the sole means of holding the guards against removal from the jaws.

13. In a device of the class described, a pair of electrode-gripping jaws formed of strip metal movable towards and from each other, each jaw being capable of flexing transversely of its thickness, individual guards for said jaws, each guard having a shallow pocket receiving a respective jaw, and a spring device out of contact with said jaws and connected to said guards and urging them towards each other and towards the jaws on which they are mounted.

LAWRENCE H. BEVARD.

REFERENCES CITED

The following references are of record in the file of this patent:

UNITED STATES PATENTS

| Number | Name | Date |
| --- | --- | --- |
| 1,723,760 | Bowers | Aug. 6, 1929 |
| 1,726,624 | Lawson | Sept. 3, 1929 |
| 1,876,786 | Stoody | Sept. 13, 1932 |
| 2,077,468 | Fausek et al. | Apr. 20, 1937 |
| 2,124,283 | Bevard | July 19, 1938 |
| 2,143,619 | Bourque | Jan. 10, 1939 |
| 2,179,440 | Wagner | Nov. 7, 1939 |
| 2,311,022 | Bourque | Feb. 16, 1943 |
| 2,322,077 | Wells | June 15, 1943 |
| 2,358,220 | Donnelly | Sept. 12, 1944 |
| 2,375,657 | Jackson | May 8, 1945 |
| 2,401,523 | Townsend | June 4, 1946 |
| 2,404,125 | Donnelly | July 16, 1946 |